United States Patent
Wakao et al.

(10) Patent No.: US 9,234,094 B2
(45) Date of Patent: Jan. 12, 2016

(54) AQUEOUS POLY(METH)ACRYLIC ACID-BASED POLYMER SOLUTION

(75) Inventors: Norihiro Wakao, Suita (JP); Akihiko Kanzaki, Suita (JP); Junichi Chosa, Suita (JP)

(73) Assignee: NIPPON SHOKUBAI CO, LTD, Osaka (JP)

( * ) Notice: Subject to any disclaimer, the term of this patent is extended or adjusted under 35 U.S.C. 154(b) by 52 days.

(21) Appl. No.: 13/704,888

(22) PCT Filed: Jun. 17, 2011

(86) PCT No.: PCT/JP2011/063964
§ 371 (c)(1),
(2), (4) Date: Dec. 17, 2012

(87) PCT Pub. No.: WO2011/158945
PCT Pub. Date: Dec. 22, 2011

(65) Prior Publication Data
US 2013/0090425 A1    Apr. 11, 2013

(30) Foreign Application Priority Data

Jun. 18, 2010    (JP) ................................ 2010-138822

(51) Int. Cl.
| C08L 33/00 | (2006.01) |
| C08L 33/02 | (2006.01) |
| C08F 2/10 | (2006.01) |
| C08F 20/06 | (2006.01) |

(52) U.S. Cl.
CPC . *C08L 33/02* (2013.01); *C08F 2/10* (2013.01); *C08F 20/06* (2013.01)

(58) Field of Classification Search
CPC ............. C08F 2/10; C08F 20/06; C08L 33/02
USPC ........................................................ 524/556
See application file for complete search history.

(56) References Cited

U.S. PATENT DOCUMENTS

| 4,840,985 | A | 6/1989 | Gonnet et al. |
| 5,077,361 | A | 12/1991 | Hughes et al. |
| 5,216,099 | A | 6/1993 | Hughes et al. |
| 5,256,746 | A | 10/1993 | Blankenship et al. |
| 5,294,686 | A | 3/1994 | Fiarman et al. |
| 5,294,687 | A | 3/1994 | Blankenship et al. |
| 5,866,678 | A | 2/1999 | Kajikawa et al. |
| 6,297,336 | B1 | 10/2001 | Shioji et al. |
| 6,627,681 | B1 | 9/2003 | Ueda et al. |
| 2002/0019329 | A1 | 2/2002 | Hemmi et al. |
| 2004/0127660 | A1 | 7/2004 | Fukuhara et al. |
| 2005/0113541 | A1 | 5/2005 | Tsumori et al. |
| 2009/0298988 | A1 | 12/2009 | Jacquemet et al. |
| 2009/0306266 | A1 | 12/2009 | Creamer et al. |
| 2012/0059106 | A1 | 3/2012 | Creamer et al. |
| 2012/0302689 | A1 | 11/2012 | Jacquemet et al. |
| 2013/0090425 | A1 | 4/2013 | Wakao et al. |
| 2013/0261257 | A1 | 10/2013 | Wakao et al. |
| 2014/0235794 | A1 | 8/2014 | Yamaguchi |

FOREIGN PATENT DOCUMENTS

| CN | 1068830 A | 2/1993 | |
| EP | 0405818 A2 | 1/1991 | |
| EP | 0510831 A1 | 10/1992 | |
| EP | 0792890 A1 | 9/1997 | |
| EP | 1074293 A1 | 2/2001 | |
| JP | 54-82416 | 6/1979 | |
| JP | 59-47265 | 3/1984 | |
| JP | 3-121101 | 5/1991 | |
| JP | H06-263803 A | 9/1994 | |
| JP | H06-287208 A | 10/1994 | |
| JP | 10-001512 A | 1/1998 | |
| JP | H11-241066 A | 9/1999 | |
| JP | 2000-080396 A | 3/2000 | |
| JP | 2000-198809 A | 7/2000 | |
| JP | 2000-239595 A | 9/2000 | |
| JP | 2000-281959 A | 10/2000 | |
| JP | 2002-80502 | 3/2002 | |
| JP | 2002-179704 A | 6/2002 | |
| JP | 2002-179933 A | 6/2002 | |
| JP | 2003236359 A * | 8/2003 | ............. B01F 17/42 |
| JP | 2003-277409 A | 10/2003 | |
| JP | 2005-139469 A | 6/2005 | |
| JP | 2009-522189 A | 6/2009 | |
| JP | 2009-242598 A | 10/2009 | |
| JP | 2009-242784 A | 10/2009 | |
| JP | 2011-021130 A | 2/2011 | |
| WO | WO-2011158945 A1 | 12/2011 | |

* cited by examiner

*Primary Examiner* — David W Wu
*Assistant Examiner* — Marie Reddick
(74) *Attorney, Agent, or Firm* — Novak Druce Connolly Bove + Quigg LLP

(57) ABSTRACT

An aqueous solution containing a poly(meth)acrylic acid-based polymer which shows excellent dispersibility for inorganic substances, satisfactory long-term dispersibility, and a favorable color is provided. The aqueous solution of the present invention is an aqueous solution comprising a poly(meth)acrylic acid-based polymer, the poly(meth)acrylic acid-based polymer including carboxyl groups, wherein in 100 mol % of the carboxyl groups, 30 to 85 mol % of the carboxyl groups are in an alkali metal salt form of the carboxyl groups, and 15 to 70 mol % of the carboxyl groups are in an acid form of the carboxyl groups, the poly(meth)acrylic acid-based polymer containing a phosphorus-containing group, the poly(meth)acrylic acid-based polymer having a weight average molecular weight of 2000 to 9000, the aqueous poly(meth)acrylic acid-based polymer solution having a concentration of inorganic anions, each including a sulfur or phosphorus atom, of 1000 to 10000 ppm relative to the aqueous poly(meth)acrylic acid-based polymer solution.

11 Claims, No Drawings

AQUEOUS POLY(METH)ACRYLIC ACID-BASED POLYMER SOLUTION

CROSS REFERENCE TO RELATED APPLICATIONS

This application is a National Phase filing under 35 U.S.C. § 371 of PCT/JP2011/063964 filed on Jun. 17, 2011; and this application claims priority to Application No. 2010-138822 filed in Japan on Jun. 18, 2010 under 35 U.S.C. § 119; the entire contents of all are hereby incorporated by reference.

TECHNICAL FIELD

The present invention relates to an aqueous poly(meth) acrylic acid-based polymer solution. More specifically, the present invention relates to an aqueous poly(meth)acrylic acid-based polymer solution which has excellent inorganic particle dispersibility and the like, and excellent color.

BACKGROUND ART

Carboxyl group-containing polymers represented by sodium poly(meth)acrylate and the like are widely used for applications such as detergent builders, pigment dispersants (dispersants for inorganic particles), chemicals for water treatment (scale inhibitors). Polymers having better properties are demanded in the markets of these applications.

In order to meet the demand, Patent Literature 1, for example, discloses a polymer with a pH maintained at 4 or higher which is obtained by reacting 100 parts by weight of a polymer of α,β-monoethylenic unsaturated carboxylic acid with 1 to 70 parts by weight of a compound containing a metal such as calcium. Patent Literature 2, for example, discloses a method of producing a water-soluble polymer obtained by continuously adding a chain transfer agent during a predetermined period in the polymerization period, where the addition rate of the chain transfer agent to the monomers is changed at least once. Patent Literature 3, for example, discloses a method of producing a low-molecular weight (meth) acrylic acid (salt)-based polymer. The method includes polymerizing a monomer component including monomers such as a monoethylenic unsaturated monomer of a monocarboxylic acid (salt) in a highly concentrated aqueous solution in the presence of an alkali substance, using a polymerization catalyst. In the method, the polymerization catalyst is a combination of persulfate and hydrogen peroxide, and the total amount of the alkali substance is 99 mol % or lower of the amount required to neutralize the whole acid groups of the monomer component. Also, the dropping of the hydrogen peroxide is set to be ended more than ten minutes before the end of dropping the monomer component.

Patent Literature 4, for example, discloses a grinding agent including acrylic acid polymers and/or copolymers. The grinding agent is for an aqueous suspension of coarse mineral particles for pigments, and includes the polymers and/or copolymers which are partially neutralized by at least one neutralizing agent having at least one monovalent functional group. Patent Literature 5, for example, discloses a method of producing a dispersion of mineral particles suitable for use as pigments. The method includes the steps of: (A) preparing a mixture comprising water and a mineral to be ground, comprising particles and the mixture having at least 75% by weight of solids content, based on the total weight of the mixture; (B) introducing a fully neutralized dispersing agent into the mixture, in an amount of from 0.1% to 0.5% by weight, based on the dry weight of the mineral present in the mixture; (C) grinding the mixture to produce an aqueous dispersion; (D) introducing at least two portions of a partially neutralized dispersing agent, which has been at least 30% neutralized, based on equivalents of acid groups into the dispersion during grinding, wherein the total of the portions is from 0.2 to 1.0% by weight, based on the dry weight of the mineral present in the mixture; and (E) continuing grinding the dispersion until 95% or more of the mineral particles have a maximum particle size below 2 microns.

CITATION LIST

Patent Literature

Patent Literature 1: JP S54-82416 A
Patent Literature 2: JP 2005-139469 A
Patent Literature 3: JP 2002-80502 A
Patent Literature 4: JP S59-47265 A
Patent Literature 5: JP 2009-242784 A

SUMMARY OF INVENTION

Technical Problem

As described above, various studies have been made on carboxylic group-containing polymers. For example, it is said that a small amount of the polymer of Patent Literature 1 and the like contributes to a favorable pigment dispersion effect. It is said that the production method of Patent Literature 2 gives a reduced amount of residual monomers, a smaller molecular weight distribution, and a favorable calcium carbonate dispersing ability to the resulting polymer. It is said that the polymer obtained by the production method of Patent Literature 3 shows a favorable pigment dispersing ability. Use of the grinding agent of Patent Literature 4 enables production of an aqueous suspension for pigments which has simultaneously a high dry solids concentration, high fineness of particles, a low degree of viscosity right after the grinding, and long-term stability. The method of Patent Literature 5 can produce a mineral dispersion having low initial viscosity, high solids content, and a minimal viscosity increase over time.

Still, for example, polymers having higher pigment dispersing ability, particularly dispersing ability not highly variable over time, than those conventional polymers, are more demanded as the pigment coating machines have become more sophisticated and precise. Also, for example, in the case of using the polymer as a dispersant for a pigment slurry for paper treatment, a polymer composition causing little coloring, as well as the above properties, is demanded so as not to affect the degree of whiteness of the resulting paper.

The object of the present invention is therefore to provide a polymer (aqueous solution) which has excellent inorganic substance dispersibility and satisfactory long-term dispersibility, and shows an excellent color.

Solution to Problem

The present inventors have made intensive studies on polymers (aqueous solutions) to solve the above problem. As a result, aqueous solutions containing a specific poly(meth) acrylic acid-based polymer have been found to achieve favorable dispersibility for inorganic substances and stable, satisfactory long-term dispersibility, and thereby the present invention has been completed.

That is, the aqueous solution of the present invention is an aqueous poly(meth)acrylic acid-based polymer solution comprising a poly(meth)acrylic acid-based polymer, the poly (meth)acrylic acid-based polymer including carboxyl groups, wherein in 100 mol % of the carboxyl groups, 30 to 85 mol % of the carboxyl groups are in an alkali metal salt form of the carboxyl groups, and 15 to 70 mol % of the carboxyl groups are in an acid form of the carboxyl groups, the poly(meth)acrylic acid-based polymer containing a phosphorus-containing group, the poly(meth)acrylic acid-based polymer having a weight average molecular weight of 2000 to 8000, the aqueous poly(meth)acrylic acid-based polymer solution having a concentration of inorganic anions, each including a sulfur or phosphorus atom, of 1000 to 10000 ppm relative to the aqueous poly(meth)acrylic acid-based polymer solution.

Another aspect of the present invention is a dispersant for inorganic particles. That is, the dispersant for inorganic particles according to the present invention is a dispersant for inorganic particles, including the aqueous poly(meth)acrylic acid-based polymer solution, the poly(meth)acrylic acid-based polymer includes carboxyl groups, wherein in 100 mol % of the carboxyl groups, 30 to 85 mol % of the carboxyl groups are in an alkali metal salt form of the carboxyl groups, and 15 to 70 mol % of the carboxyl groups are in an acid form of the carboxyl groups, the poly(meth)acrylic acid-based polymer containing a phosphorus-containing group, the poly(meth)acrylic acid-based polymer having a weight average molecular weight of 2000 to 8000, the aqueous poly(meth)acrylic acid-based polymer solution having a concentration of inorganic anions, each including a sulfur or phosphorus atom, of 1000 to 10000 ppm relative to the dispersant.

Another aspect of the present invention is a slurry of inorganic particles. That is, the slurry of inorganic particles according to the present invention is a slurry of inorganic particles, including the aqueous poly(meth)acrylic acid-based polymer solution, the slurry of inorganic particles including an acid equivalent amount of 0.05 to 10% by mass of the poly(meth)acrylic acid-based polymer in 100% by mass of the slurry of inorganic particles, the slurry of inorganic particles including 70% by mass or more of inorganic particles in 100% by mass of the slurry of inorganic particles.

Advantageous Effects of Invention

The aqueous solution containing the poly(meth)acrylic acid-based polymer (the aqueous poly(meth)acrylic acid-based polymer solution comprising a poly(meth)acrylic acid-based polymer) of the present invention shows an excellent color, excellent dispersibility for dirt or inorganic particles such as inorganic pigments, and long-term dispersibility. Accordingly, the aqueous solution, when used as a detergent builder or dispersant for inorganic particles, can achieve excellent washing performance and stable long-term dispersibility for inorganic particles.

DESCRIPTION OF EMBODIMENTS

Hereinafter, the present invention is described in detail.
[Poly(Meth)Acrylic Acid-Based Polymer]

The aqueous poly(meth)acrylic acid-based polymer solution of the present invention (also referred to as the polymer aqueous solution of the present invention) contains a poly(meth)acrylic acid-based polymer (also referred to as the poly(meth)acrylic acid-based polymer of the present invention).

The poly(meth)acrylic acid-based polymer represents a polymer that has a structure derived from a (meth)acrylic acid (salt). The structure derived from a (meth)acrylic acid (salt) refers to a structure that is formed by radical polymerization of a (meth)acrylic acid (salt), and represented by $-CH_2CR$(COOM)-$. In the structure, R represents a hydrogen atom or methyl group, and M represents a hydrogen atom, metal atom, ammonium salt, or organic amine salt. The metal atom is exemplified by alkali metal atoms (e.g., Li, Na, K) and alkaline earth metal atoms (e.g., Ca, Mg).

The (meth)acrylic acid (salt) represents acrylic acid, an acrylic acid salt, methacrylic acid, or a methacrylic acid salt. Among these, acrylic acid and an acrylic acid salt are preferred. Each of these (meth)acrylic acid (salt) may be used alone, or two or more of these may be used.

Examples of the salts in the (meth)acrylic acid (salt) include metal salts, ammonium salts, and organic amine salts. Among these, alkali metal salts are preferred, and sodium salts are more preferred. Each of these salts for the (meth)acrylic acid (salts) may be used alone, or two or more of these may be used.

In this regard, the poly(meth)acrylic acid-based polymer of the present invention essentially includes a structure derived from a (meth)acrylic acid and a structure derived from a (meth)acrylic acid salt as (meth)acrylic acid (salt)-derived structures, and essentially includes a structure derived from an alkali metal salt of (meth)acrylic acid as the (meth)acrylic acid salt-derived structure.

The poly(meth)acrylic acid-based polymer of the present invention includes 15 to 70 mol % of acid carboxyl groups (unneutralized carboxyl groups) in 100 mol % of the whole carboxylic groups. The ratio of the acid carboxyl groups is preferably 20 to 70 mol %, more preferably 30 to 70 mol %, and still more preferably 40 to 70 mol %. With a ratio in the above range, the poly(meth)acrylic acid-based polymer of the present invention, when used for a slurry of inorganic particles, can achieve improved long-term stability of the slurry viscosity, and a favorable color of the aqueous poly(meth)acrylic acid-based polymer solution.

The feature of the poly(meth)acrylic acid-based polymer of the present invention is that the carboxyl groups in the poly(meth)acrylic acid-based polymer is partially neutralized (partial neutralization), and that the poly(meth)acrylic acid-based polymer contains 30 to 85 mol % of alkali metal salts of carboxyl groups in 100 mol % of the whole carboxyl groups. The ratio of the alkali metal salts of carboxyl groups is preferably 30 to 80 mol %, more preferably 30 to 70 mol %, and still more preferably 30 to 60 mol %. With a ratio in the above range, the poly(meth)acrylic acid-based polymer of the present invention, when used for a slurry of inorganic particles, can achieve improved long-term stability of the slurry viscosity.

The poly(meth)acrylic acid-based polymer of the present invention preferably contains 15 to 70 mol %, more preferably 20 to 70 mol %, still more preferably 30 to 70 mol %, and particularly preferably 40 to 70 mol %, of a (meth)acrylic acid-derived structure, in 100 mol % of the whole monomer-derived structures (i.e., the total of the (meth)acrylic acid (salt)-derived structures and the structures derived from the later-described other monomers) in the poly(meth)acrylic acid-based polymer. With a ratio in the above range, the poly(meth)acrylic acid-based polymer of the present invention, when used for a slurry of inorganic particles, can achieve further improved long-term stability of the slurry viscosity, and a more favorable color of the aqueous poly(meth)acrylic acid-based polymer solution.

Here, the (meth)acrylic acid-derived structure is represented by $-CH(R)CH(COOH)-$ (wherein R represents H or $CH_3$), and the term excludes structures whose carboxyl groups are in the form of salts. In the present invention, in the case that, for example, an acrylic acid is polymerized and then the carboxyl group is neutralized, the structure is regarded as being derived from an acrylic acid salt, and is not regarded as being an acrylic acid-derived structure.

The poly(meth)acrylic acid-based polymer of the present invention preferably contains 30 to 85 mol %, more preferably 30 to 80 mol %, still more preferably 30 to 70 mol %, and particularly preferably 30 to 60 mol %, of a structure derived from an alkali metal salt of a (meth)acrylic acid, in 100 mol % of the whole monomer-derived structures in the poly(meth)acrylic acid-based polymer. With a ratio in the above range, the poly(meth)acrylic acid-based polymer of the present invention, when used for a slurry of inorganic particles, can achieve improved long-term stability of the slurry viscosity.

Although the (meth)acrylic acid salt-derived structure is formed through radical polymerization of a (meth)acrylic acid salt as described above, the structure is not limited to the structures actually formed through polymerization of a (meth)acrylic acid salt. For example, a structure of a salt of a carboxyl group which is formed through polymerizing a (meth)acrylic acid, and then neutralizing the carboxyl group ((meth)acrylic acid group) with an appropriate base is also included in the (meth)acrylic acid salt-derived structure. That is, a structure derived from an alkali metal salt of a (meth)acrylic acid is a structure represented by —CH(R)CH(COOM)-(wherein R is H or $CH_3$, M is an alkali metal atom such as Li, Na, and K), regardless of the raw materials and production methods.

The poly(meth)acrylic acid-based polymer of the present invention may contain (meth)acrylic acid salt-derived structure(s) other than the structure derived from an alkali metal salt of a (meth)acrylic acid. The amount of the (meth)acrylic acid salt-derived structure(s) other than the structure derived from an alkali metal salt of a (meth)acrylic acid in the poly(meth)acrylic acid-based polymer of the present invention is preferably 0 to 30 mol %, more preferably 0 to 20 mol %, and still more preferably 0 to 10 mol %, in 100 mol % of the whole monomer-derived structures in the poly(meth)acrylic acid-based polymer. With a ratio in the above range, the poly(meth)acrylic acid-based polymer of the present invention, when used for a slurry of inorganic particles, can achieve further improved long-term stability of the slurry viscosity.

The poly(meth)acrylic acid-based polymer of the present invention may include only the (meth)acrylic acid (salt)-derived structures, or may include structures derived from other monomers copolymerizable with the (meth)acrylic acid (salts).

Specific examples of the other monomers include monomers containing carboxyl groups other than (meth)acrylic acids (e.g., maleic acid, fumaric acid, itaconic acid, crotonic acid, 2-methyleneglutaric acid) and their salts; hydroxyl group-containing alkyl(meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and α-hydroxymethylethyl (meth)acrylate; alkyl (meth)acrylates which are esters with C1 to C18 alkyl groups of (meth)acrylic acids, such as methyl (meth)acrylate, ethyl (meth)acrylate, butyl (meth)acrylate, cyclohexyl (meth)acrylate, and lauryl (meth)acrylate; amino group-containing acrylates, such as dimethylaminoethyl (meth)acrylate and their quaternized compounds; amide group-containing monomers such as (meth)acrylamide, dimethylacrylamide, and isopropylacrylamide; vinyl esters such as vinyl acetate; alkenes such as ethylene and propylene; aromatic vinyl monomers such as styrene; maleimide and maleimide derivatives such as phenylmaleimide and cyclohexyl maleimide; nitrile group-containing vinyl monomers such as (meth)acrylonitrile; monomers containing a sulfonic acid group (e.g., 3-allyloxy-2-hydroxypropanesulfonic acid, 2-acrylamido-2-methylpropane sulfonic acid, styrene sulfonic acid, and vinylsulfonic acid) and their salts; monomers containing phosphonic acid groups such as vinylphosphonic acid and (meth)allylphosphonic acid; monomers containing an aldehyde group such as (meth)acrolein; alkyl vinyl ethers such as methyl vinyl ether, ethyl vinyl ether, and butyl vinyl ether; monomers containing other functional groups such as vinyl chloride, vinylidene chloride, allyl alcohol, and vinyl pyrrolidone; and polyalkylene glycol chain-containing monomers such as polyalkylene glycol (meth)acrylate and monoalkoxy polyalkylene glycol (meth)acrylate and monomers with a structure including an unsaturated alcohol (e.g., vinyl alcohol, (meth)allyl alcohol, isoprenol) with 1 to 300 mol of an alkylene oxide added. As the other monomers, one of these may be used alone, or two or more of these may be used in combination.

The poly(meth)acrylic acid-based polymer of the present invention preferably includes an acid equivalent amount of 90% by mass or more of the (meth)acrylic acid (salt)-derived structure in 100% by mass of the whole monomer-derived structures (i.e., the sum of the (meth)acrylic acid (salt)-derived structure and the structures derived from the other monomers) in the poly(meth)acrylic acid-based polymer of the present invention. An acid equivalent amount of 90% by mass or more is likely to further improve the long-term dispersibility of the polymer aqueous solution of the present invention for inorganic particles (pigment).

Here, the acid equivalent amount refers to a mass ratio calculated by taking salt monomers as the corresponding acid monomers. For example, the structure derived from sodium (meth)acrylate is taken as a structure derived from a (meth)acrylic acid in the mass ratio calculation. In this way, other monomers are also calculated in acid equivalent amounts.

The poly(meth)acrylic acid-based polymer of the present invention preferably includes 0 to 10% by mass of structures derived from the other monomers in 100% by mass of the whole monomer-derived structures in the poly(meth)acrylic acid-based polymer of the present invention.

The poly(meth)acrylic acid-based polymer of the present invention contains a phosphorus-containing group because it controls the molecular weight distribution and improves long-term dispersibility. Preferably, the polymer has a phosphorus atom in its main chain. A phosphorus-containing group can be introduced into a molecule by, as described later, for example, using a phosphorus-containing compound (e.g., a hypophosphorous acid (salt)) as a chain transfer agent in production of the poly(meth)acrylic acid-based polymer of the present invention. Examples of the phosphorus-containing group include phosphinate groups, phosphonate groups, and phosphate ester groups. Particularly preferred among these are phosphinate groups because they improve particularly the long-term dispersibility.

Phosphorus-containing groups introduced into the poly (meth)acrylic acid-based polymer are detectable by $^{31}P$-NMR analysis, for example.

The poly(meth)acrylic acid-based polymer of the present invention has a weight average molecular weight of 2,000 to 9,000, preferably 2500 to 8500, and more preferably 3,000 to 8,000. Too large a value of the weight average molecular weight may increase the viscosity, and make the handling of the polymer cumbersome and complicated. Too small a value of the weight average molecular weight, on the other hand, may decrease the dispersibility of clay or inorganic particles and the like, and lead to unsatisfactory properties of the polymer as a detergent builder or dispersant for pigments (inorganic particles).

For the value of the weight average molecular weight of the poly(meth)acrylic acid-based polymer of the present invention, a value measured by the method mentioned in the below-described examples is used.

The poly(meth)acrylic acid-based polymer of the present invention preferably has a molecular weight distribution (weight average molecular weight (Mw)/number average molecular weight (Mn)) of 1.1 to 3.0, more preferably 1.5 to 2.8, and still more preferably 1.8 to 2.6.

Too small a value of the molecular weight distribution may increase the slurry viscosity of an inorganic substance right after grinding in the case of wet grinding of inorganic substance, for example when the poly(meth)acrylic acid-based polymer of the present invention is used as a dispersant for the inorganic substance. Too large a value of the molecular weight distribution may decrease the long-term viscosity stability of the slurry.

For the value of the molecular weight distribution of the poly(meth)acrylic acid-based polymer of the present invention, a value measured by the method mentioned in the below-described examples is used.

[Aqueous Poly(Meth)Acrylic Acid-Based Polymer Solution]

The polymer aqueous solution of the present invention essentially includes the poly(meth)acrylic acid-based polymer of the present invention. The polymer aqueous solution can further include an unreacted (meth)acrylic acid (salt), unreacted other monomers, an unreacted polymerization initiator, a polymerization initiator degradation product, and the like.

Also, in the present description, the poly(meth)acrylic acid-based polymer of the present invention and the aqueous poly(meth)acrylic acid-based polymer solution of the present invention may also be collectively referred to herein as "the poly(meth)acrylic acid-based polymer (aqueous solution) of the present invention".

The amount of unreacted monomers in the polymer aqueous solution (i.e., the total amount of the (meth)acrylic acid (salt) and the other monomers) may be different depending on the monomers used. The amount is preferably less than 1% by mass, more preferably less than 0.5% by mass, and still more preferably less than 0.1% by mass in 100% by mass of the solids content of the polymer aqueous solution.

The above aqueous poly(meth)acrylic acid-based polymer solution is not particularly limited, and may be produced by producing a poly(meth)acrylic acid-based polymer in the later-described aqueous medium, and then removing impurities through a purification process. In terms of the production efficiency, the aqueous poly(meth)acrylic acid-based polymer solution is preferably obtained without the purification process. The aqueous poly(meth)acrylic acid-based polymer solution of the present invention also includes ones obtained through a polymerization process of synthesizing a poly(meth)acrylic acid-based polymer in an aqueous medium, and then a process of diluting the obtained polymer aqueous solution (to 1 to 400% by mass relative to 100% by mass of the obtained polymer aqueous solution) with a small amount of water or condensing, for better handling.

The aqueous poly(meth)acrylic acid-based polymer solution of the present invention includes the poly(meth)acrylic acid-based polymer of the present invention, and a solvent with water as an essential component. In this case, the amount of the solvent is preferably 50 to 500% by mass, more preferably 60 to 400% by mass, still more preferably 80 to 300% by mass, and most preferably 90 to 200% by mass, in 100% by mass of the poly(meth)acrylic acid-based polymer.

The amount of the poly(meth)acrylic acid-based polymer of the present invention in the polymer aqueous solution of the present invention is preferably 16 to 66% by mass, more preferably 20 to 62% by mass, and still more preferably 25 to 60% by mass, in 100% by mass of the aqueous poly(meth)acrylic acid-based polymer solution.

In addition, the amount of an organic solvent in the polymer aqueous solution of the present invention is preferably decreased as much as possible, because of limited conditions on use of the aqueous poly(meth)acrylic acid-based polymer solution and in terms of improvement of the properties, as described later. For example, the amount of an organic solvent is preferably 10% by mass or less, more preferably 5% by mass or less, and still more preferably 1% by mass or less in 100% by mass of the aqueous poly(meth)acrylic acid-based solution.

The aqueous poly(meth)acrylic acid-based polymer solution of the present invention has a feature of a concentration of inorganic anions, each including a sulfur or phosphorus atom, of 1000 to 10000 ppm relative to the polymer aqueous solution. A concentration of the inorganic anions each including a sulfur or phosphorus atom of higher than 10000 ppm is likely to decrease the long-term dispersibility of the polymer aqueous solution for inorganic particles. A concentration of the inorganic anions each including a sulfur or phosphorus atom of lower than 1000 ppm brings difficulties in production of a polymer aqueous solution having excellent long-term dispersibility for inorganic particles.

Examples of the inorganic anion each including a sulfur or phosphorus atom include sulfate ions, sulfite ions, phosphoric acid ions, phosphorous acid ions, and hypophosphite ions.

The polymer aqueous solution preferably has a concentration of the inorganic anions each including a sulfur or phosphorus atom in the above range in the case that the later-described active component value is adjusted to 35 to 45%.

The aqueous poly(meth)acrylic acid-based polymer solution of the present invention preferably include inorganic anion including a phosphorus atom, for example, preferably include inorganic anion including a phosphorus atom at a concentration of 1000 to 6000 ppm relative to the aqueous solution because the poly(meth)acrylic acid-based polymer of the present invention shows particularly improved dispersibility for inorganic particles in the case that the polymer has been produced by polymerization in the presence of a hypophosphorous acid (salt). A concentration of inorganic anions each including a phosphorus atom in this range further improves the color of the slurry of inorganic particles after drying, in the case that the slurry of inorganic particles has been produced using an aqueous poly(meth)acrylic acid-based polymer solution. A concentration of inorganic anions each including a phosphorus atom of higher than 6000 ppm, on the other hand, may decrease the long-term stability of dispersibility for inorganic particles. The concentration of inorganic anions each including a phosphorus atom in the aqueous solution is preferably 1500 to 5500 ppm, more preferably 2000 to 5000 ppm, and particularly preferably 2500 to 4500 ppm.

The polymer aqueous solution preferably has a concentration of inorganic anions each including a phosphorus atom in the above range in the case that the later-described active component value is adjusted to 35 to 45%.

The aqueous poly(meth)acrylic acid-based polymer solution of the present invention preferably has a viscosity (25° C.) of 300 to 1500 mPa·s when the solids content (nonvolatile matter) concentration is adjusted to 35 to 70% by mass. A viscosity in the above range achieves favorable storage stability of the color and other properties of the polymer aqueous solution, and improves the operability of the slurry production equipment when the polymer aqueous solution is used as a dispersant for inorganic particles, for example. The viscosity of the aqueous poly(meth)acrylic acid-based polymer solution can be easily adjusted by changing the conditions such as the initiator to be used and its amount for use, the neutralizer to be used and its amount for use, and the degree of neutralization and the like. The viscosity is more preferably 350 to 1300 mPa·s, and particularly preferably 400 to 1000 mPa·s.

The viscosity is a value measured by a Brookfield viscometer under the measurement conditions of rotor No. 4, 60 rpm, and five minutes.

The aqueous poly(meth)acrylic acid-based polymer solution of the present invention preferably has a pH of 4.0 to 9.0 when the solids content (nonvolatile matter) concentration is adjusted to 35 to 70% by mass. A pH in the above range achieves favorable storage stability of the color and other properties of the polymer aqueous solution, and achieves favorable dispersibility when the polymer aqueous solution is used as a dispersant for inorganic particles, for example. The pH of the aqueous poly(meth)acrylic acid-based polymer solution can be easily adjusted by changing conditions such as the initiator to be used and its amount for use, the neutralizer to be used and its amount for use, and the degree of neutralization and the like. The pH is more preferably 4.0 to 8.0, and particularly preferably 4.0 to 6.0.

The aqueous poly(meth)acrylic acid-based polymer solution of the present invention preferably does not cause much coloring. For example, the b value, which is measured with the colormeter SE2000 (product of Nippon Denshoku Industries Co., Ltd.) as the color of the aqueous poly(meth)acrylic acid-based polymer solution, is preferably 4.6 or lower. The b value is more preferably 3.0 or lower, still more preferably 2.8 or lower, and particularly preferably 2.7 or lower. The later-described method of producing the aqueous poly(meth)acrylic acid-based polymer solution of the present invention can suppress coloring of the polymer aqueous solution to a low level (i.e. achieve favorable color). A low level of coloring enables the polymer aqueous solution to be suitable for use as a dispersant or detergent builder.

[Poly(Meth)Acrylic Acid-Based Polymer Composition]

The aqueous poly(meth)acrylic acid-based polymer solution of the present invention can be used in dried, or substituted and diluted with another solvent (the polymer in such a form is referred to as a poly(meth)acrylic acid-based polymer composition). The poly(meth)acrylic acid-based polymer composition of the present invention includes a composition obtained by drying the polyacrylic acid-based polymer of the present invention and then redissolving the dried polymer in water, and a composition obtained by adding any other components to the dried polymer.

The amount of unreacted monomers in the poly(meth)acrylic acid-based polymer composition of the present invention, the amounts of the solvent and organic solvent, the amount of the poly(meth)acrylic acid-based polymer of the present invention, and the concentration of the inorganic anions each including a sulfur or phosphorus atom, viscosity, pH, and b value are preferably the same as the respective values described above for the aqueous poly(meth)acrylic acid-based polymer solution of the present invention.

[Method of Producing Poly(Meth)Acrylic Acid-Based Polymer (Aqueous Solution)]

<Monomer Composition>

The poly(meth)acrylic acid-based polymer of the present invention is preferably produced by polymerization with a (meth)acrylic acid (salt) as an essential component. The poly(meth)acrylic acid-based polymer of the present invention may be produced by copolymerization of a (meth)acrylic acid (salt) with the above-mentioned other monomers. The proportion of the (meth)acrylic acid (salt) in an acid equivalent amount is preferably 90% by mass or more in 100% by mass of the whole monomers used for production of the poly(meth)acrylic acid-based polymer of the present invention (the sum of the (meth)acrylic acid (salt) and the other monomers). A concentration of 90% by mass or more is likely to improve the long-term dispersibility for inorganic particles of the polymer aqueous solution to be obtained.

Here, as mentioned above, the acid equivalent amount refers to a mass ratio calculated by taking salt monomers as the corresponding acid monomers. For example, sodium (meth)acrylate is taken as a (meth)acrylic acid in the mass ratio calculation. In this way, other monomers are also calculated in acid equivalent amounts.

The method of producing the poly(meth)acrylic acid-based polymer (aqueous solution) of the present invention preferably employs an acrylic acid and acrylic acid salt as the (meth)acrylic (salt).

<Neutralization Process>

The poly(meth)acrylic acid-based polymer (aqueous solution) of the present invention is preferably produced by a method including a process (process N) of neutralizing an aqueous solution that contains an acid and/or partially neutralized poly(meth)acrylic acid-based polymer, with an alkali metal compound. The production method is likely to achieve a particularly favorable color of the polymer aqueous solution to be obtained, and show particularly favorable dispersibility when used as a dispersant for inorganic particles, for example. Examples of the alkali metal compound include alkali metal hydroxides such as sodium hydroxide and potassium hydroxide, and alkali metal carbonates such as sodium carbonate, potassium carbonate, and sodium hydrogencarbonate. The process N can utilize a neutralizer other than the above alkali metal compounds, which can be exemplified by alkaline earth metal compounds such as calcium hydroxide, magnesium hydroxide, and calcium oxide, amines such as monoethanolamine and diethanolamine, and ammonia.

The amount of the alkali metal compound used in the process N is set so that the ratio of the alkali metal salt of a carboxyl group to the whole carboxyl groups of the above poly(meth)acrylic acid-based polymer is in the above range. For example, the amount is 30 to 85 mol % in 100 mol % of the whole carboxyl groups in the poly(meth)acrylic acid-based polymer.

For simplification of the production process, the aqueous poly(meth)acrylic acid-based polymer solution may be produced by polymerization that employs an alkali metal salt of a (meth)acrylic acid as an essential component, such that the neutralization process can be skipped. In this case, introducing the structure derived from the initiator into the molecule of the polymer tends to be difficult, which may not allow the polymer aqueous solution to be used as an additive for detergents or dispersant for inorganic particles.

<Polymerization Process>

The poly(meth)acrylic acid-based polymer (aqueous solution) of the present invention is preferably produced by a method including polymerization with a (meth)acrylic acid (salt) as an essential component, and a process of producing an aqueous solution that contains an acid and/or partially neutralized poly(meth)acrylic acid-based polymer (the process is referred to as a process P).

In the case that the production method of the present invention includes the neutralization process (process N), the neutralization index of the acid and/or partially neutralized poly(meth)acrylic acid-based polymer produced through the process P (after the process P) (i.e., the ratio of the neutralized acid radicals to the whole acid radicals (neutralized and unneutralized)) is set to a value lower than the neutralization index of a final product. The neutralization index is preferably 0 to 10%, more preferably 0 to 7%, and particularly preferably 0 to 5% because the long-term dispersibility for inorganic particles and the color of the aqueous solution are likely to be improved.

(Polymerization Initiator)

The poly(meth)acrylic acid-based polymer of the present invention can be obtained by polymerizing a monomer composition including a (meth)acrylic acid (salt) as an essential component in the presence of a polymerization initiator (or simply an initiator).

The polymerization initiator can be any compound commonly used as a polymerization initiator, such as a persulfates (e.g., sodium persulfate, potassium persulfate, ammonium persulfate); hydrogen peroxide; an azo compounds (e.g., dimethyl-2,2'-azobis(2-methylpropionate), 2,2'-azobis(2-amidinopropane)hydrochloride, 4,4'-azobis-4-cyanovaleate, azobisisobutyronitrile, 2,2'-azobis(4-methoxy-2,4-dimethylvaleronitrile)); and an organic peroxides (e.g., benzoyl peroxide, lauroyl peroxide, peracetic acid, di-t-butyl peroxide, cumene hydroperoxide). Each of these polymerization initiators may be used alone, or two or more of these may be used in the form of a mixture. One of these polymerization initiators is preferably used alone, so that the molecular weight distribution of the polymer is likely to be small.

The amount of the polymerization initiator may be any value, but is preferably 15 g or smaller, and more preferably 0.1 to 12 g, per mole of the whole monomers.

Among the polymerization initiators, persulfate is particularly preferably used because it does not greatly affect the dispersibility for inorganic particles of the poly(meth)acrylic acid-based polymer to be obtained. However, for improvement of the long-term dispersibility for inorganic particles, the amount used of persulfate is preferably 1.9 g or smaller, more preferably 1.6 g or smaller, still more preferably 1.2 g or smaller, and particularly preferably 1.1 g or smaller, per mole of the whole monomers. The minimum amount of the persulfate is preferably 0.1 g or greater, and more preferably 0.5 g or greater, per mole of the whole monomers.

The method of adding the polymerization initiator may be any addition method, but the substantial amount of the polymerization initiator to be continuously dropped is preferably 50% by mass or greater, particularly preferably 80% by mass or greater, and most preferably the entire amount, of the predetermined required amount relative to the total amount for use. In this way, the polymerization initiator is preferably continuously dropped. The drop rate can be appropriately set.

The drop time in the case of adding the polymerization initiator by continuous dropping is not particularly limited. But, the dropping is preferably ended by the end of dropping of the monomers, more preferably within 30 minutes after the end of the monomer dropping, and particularly preferably within 5 to 20 minutes after the end of the monomer dropping, in the case that a comparatively fast decomposing initiator, such as ammonium persulfate, potassium persulfate, and sodium persulfate, is used under the later-described conditions of the polymerization temperature and pH for the polymerization. Thereby, the residual monomers in the polymer can be greatly reduced. Here, ending the dropping of the initiator before the end of the monomer dropping does not adversely affect the polymerization. The drop time may be set depending on the amount of residual monomers in the polymer obtained.

Only the preferred range of the drop end time for the comparatively fast decomposing initiator has been described above. But, the drop start time, meanwhile, is not particularly limited and may be appropriately set. For example, in some cases, dropping of the initiator may be started before the start of monomer dropping. Particularly in the case of a combination system in which two or more initiators are used in combination, dropping of one of the initiators may be started, and after an elapse of predetermined time or after the end of the dropping, dropping of other initiator(s) may be started. In any case, the drop start time is appropriately set depending on the decomposition rate of the initiator and the reactivity of the monomers.

(Chain Transfer Agent)

In the method of producing the poly(meth)acrylic acid-based polymer of the present invention, a chain transfer agent other than a polymerization initiator can also be used. Any compound which can adjust molecular weight is usable as the chain transfer agent here, and a compound typically used as a chain transfer agent can be used. Specific examples of the compound include thiol chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octylmercaptan, and butyl thioglycolate; halides such as carbon tetrachloride, methylene chloride, bromoform, and bromotrichloroethane; secondary alcohols such as isopropanol and glycerol; phosphorous acid, phosphite, hypophosphorous acid, hypophosphite and their hydrates; and low-grade oxides and their salts, such as sulfurous acid, bisulfite, dithionous acid, metabisulfurous acid, and their salts (namely, for example, sodium hydrogensulfite, potassium hydrogensulfite, sodium dithionite, potassium dithionate, and bisulfites such as sodium metabisulfite and potassium metabisulfite). Each of the chain transfer agents may be used alone, and two or more of these may be used in the form of a mixture.

The additive amount of the chain transfer agent is not particularly limited, and is preferably 1 to 20 g, and more preferably 2 to 15 g per mole of the whole monomer components. An amount of less than 1 g may disable control of the molecular weight, whereas an amount of more than 20 g may produce residual chain transfer agents and decrease the polymer purity.

Among the chain transfer agents, hypophosphorous acid (salt) and/or bisulfite are/is preferably used for improvement of dispersibility for inorganic particles of the aqueous poly(meth)acrylic acid-based polymer solution to be obtained. Particularly, hypophosphorous acid (salt) is preferably used for improvement of the long-term dispersibility. Here, for improvement of the long-term dispersibility, the amount of the hypophosphorous acid (salt) and/or bisulfite (in the case of using these in combination, the total amount of these) is preferably 5.0 g or less, more preferably 4.5 g or less, and still more preferably 4.0 g or less per mole of the whole monomers. The minimum amount is preferably 1.0 g or more, and more preferably 1.5 g or more, per mole of the whole monomers.

If the amount of the hypophosphorous acid (salt) and/or bisulfite per mole of the whole monomers is more than the maximum amount mentioned above, the amount of the hypophosphorous acid (salt) and/or bisulfite which do(es) not contribute to chain transfer (i.e. the amount of the hypophosphorous acid (salt) and/or bisulfite which are/is not incorporated into polymer terminals) increases to cause an increase in the amount of inorganic anions, whereby the long-term dispersibility may decline or the color of the poly(meth)acrylic acid-based polymer may be deteriorated.

The term "hypophosphorous acid (salt)" herein is a general term used to refer to hypophosphorous acid and hypophosphite collectively.

(Decomposition Catalyst, Reducing Compound)

In the method of producing the poly(meth)acrylic acid-based polymer of the present invention, a decomposition catalyst for the polymerization initiator and a reducing compound (also referred to as a reaction accelerator) may be used (may be added to the polymerization system) in addition to the polymerization initiator.

Examples of compounds functioning as the decomposition catalyst and reducing compound for the polymerization initiator include heavy-metal ions (or heavy metal salts). That is, in the method of producing the polyacrylic acid polymer of the present invention, heavy metal ions (or heavy metal salts) may be used (may be added to the polymerization system) in addition to the polymerization initiator. Also, in the present specification, the term "heavy metal ion" herein refers to a metal with a specific gravity of 4 g/cm$^3$ or more.

Examples of the heavy-metal ion include iron, cobalt, manganese, chromium, molybdenum, tungsten, copper, silver, gold, lead, platinum, iridium, osmium, palladium, rhodium, and ruthenium. Each of these heavy metals may be used alone, or two or more of these may be used. Among these, iron is more preferred.

The ionic valence of the heavy metal ion is not limited. For example, in the case that iron is used as the heavy metal, the iron ion in the initiator may be $Fe^{2+}$ or $Fe^{3+}$, or a combination of these.

The heavy-metal ion is added to the reaction system by adding an aqueous solution or water-based solution, obtained by dissolving a heavy metal salt (heavy metal compound), into the polymerization system in the present invention. The heavy metal salt used here may be any heavy metal salt containing heavy metal ions desired to be contained in the initiator, and therefore may be determined depending on the initiator used. In the case of using iron as the heavy metal ion, a heavy metal salt such as Mohr's salt ($Fe(NH_4)_2(SO_4)_2 \cdot 6H_2O$), ferrous sulfate heptahydrate, ferrous chloride, and ferric chloride is preferably used. In the case of using manganese as the heavy metal ion, manganese chloride and the like is suitable for use. In the case of using any of these heavy metal salts, each of them, being a water-soluble compound, can be used in the form of an aqueous solution which may have excellent handleability.

Also, the solvent of the solution obtainable by dissolving the heavy metal salt is not limited to water, and may be any solvent that does not drastically inhibit the polymerization reaction and does not deteriorate the solubility of the heavy metal salt in the production of the poly(meth)acrylic acid-based polymer (aqueous solution) of the present invention.

The heavy-metal ion is added to the polymerization system in the form of an aqueous solution or water-based solution. However, in the production method of the present invention, the heavy metal salt may be added in the form of an aqueous solution of a heavy metal salt and carboxyl group-containing compound in adding the heavy metal salt into the polymerization system. If the heavy metal salt, when added to the polymerization system, is in the form of an aqueous solution of the heavy metal salt and the carboxyl group-containing compound, the heavy-metal ions give stable effects which lead to effects of reducing variation of the molecular weight of the polymer to be obtained, thereby resulting in stable production of a polymer with a desired molecular weight. The "polymerization system" refers to the inside of the reaction vessel in which a polymerization reaction is to be performed or is being performed. Typically, the polymerization system refers to the polymerization solvent as the initial feed, or the polymerization solution content during the polymerization. In the case of employing the heavy metal salt and the carboxyl group-containing compound, the ratio between the heavy metal salt and the carboxyl group-containing compound is preferably 1 to 100 parts by mass, and more preferably 10 to 80 parts by mass of the carboxyl group-containing compound for each 100 parts by mass of the heavy metal salt.

The aqueous heavy metal salt solution to be added to the polymerization system is preferably controlled to have a pH of 8 or lower, more preferably 7 or lower, and particularly preferably 6 or lower.

The carboxyl group-containing compound is an organic compound containing a carboxyl group, and may be, for example, acetic acid, propionic acid, butyric acid, formic acid, oxalic acid, succinic acid, glycolic acid, or glyoxylic acid. Still, in terms of reduction of impurities, a compound with a polymerizable carbon-carbon unsaturated double bond is preferred. Examples of such a compound include (meth)acrylic acid, maleic acid, fumaric acid, itaconic acid, crotonic acid, and 2-methyleneglutaric acid, and their anhydrates.

The amount of the heavy-metal ion is preferably 0.1 to 10 ppm in the total mass of the polymerization reaction solution at the end of the polymerization reaction. An amount of the heavy metal ions of lower than 0.1 ppm may not achieve the effects of the heavy metal ions. Meanwhile, an amount of the heavy metal ions of higher than 10 ppm may deteriorate the color of the polymer to be obtained. In the case that the polymer as the product is used as a detergent builder, for example, too large an amount of the heavy metal ions may cause stain in the detergent builder.

Here, "at the end of the polymerization reaction" refers to the time at which the polymerization reaction has been substantially completed in the polymerization reaction solution, and the desired polymer is obtained. For example, in the case of successively neutralizing a polymer polymerized in a polymerization reaction solution with an alkali component, the amount of the heavy metal ion is calculated based on the total mass of the polymerization reaction solution after the neutralization. When two or more heavy metal ions are included, the total amount of the heavy metal ions is required to be in the above range.

The concentration of the heavy metal compound in the aqueous solution or water-based solution obtained by dissolving a heavy metal compound to be added to polymerization system is preferably 0.1% by mass to 10% by mass.

Examples of decomposition catalyst for the polymerization initiator other than the heavy-metal ions (heavy metal salts) include halogenated metals such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids (e.g., formic acid, acetic acid, propionic acid, butyric acid, isobutyric acid, benzoic acid), their esters, and their metal salts; and heterocyclic amines (e.g., pyridine, indole, imidazole, carbazole) and their derivatives. Each of these decomposition catalysts may be used alone, or two or more of these may be used in combination.

Examples of the reducing compounds other than the heavy-metal ions (heavy metal salts) include inorganic compounds such as a boron trifluoride ether adduct and perchloric acid; sulfur-containing compounds such as sulfur dioxide, sulfite, sulfate, bisulfite, thiosulfate, sulfoxylate, benzenesulfinic acid and their substitution products, and homologs of annular sulfinic acids (i.e. paratoluene sulfinic acid); mercapto compounds such as octylmercaptan, dodecyl mercaptan, mercaptoethanol, α-mercaptopropionic acid, thioglycolic acid, thiopropionic acid, α-thiopropionic acid sodium-sulfopropyl ester, and α-thiopropionic acid sodium sulfoethyl ester; nitrogen-containing compounds such as hydrazine, β-hydroxyethyl hydrazine, and hydroxylamine; aldehydes such as formaldehyde, acetaldehyde, propionaldehyde, n-butyraldehyde, isobutyraldehyde, and isovaleraldehyde; and ascorbic acid. Each of these reducing compounds may be used alone, or two or more of them may be used in combination. Reducing compounds such as a mercapto compound may be added as a chain transfer agent.

The method of producing the poly(meth)acrylic acid-based polymer (aqueous solution) of the present invention can employ a pH regulator and a buffer and the like as necessary, as well as the polymerization initiator, chain transfer agent, and reaction accelerator.

(Polymerization Solution)

The poly(meth)acrylic acid-based polymer of the present invention is preferably produced through solution polymerization. The solvent usable at this time is preferably a mixed solvent with 50% by mass of water in the total amount of the solvent, or water. Use of water alone is suitable because a desolventization process can be skipped. In the case of using the chain transfer agent, the solvent is preferably a solvent that is not easily involved in the chain transfer, for increasing the chain transfer efficiency (incorporating a larger amount of the chain transfer agent into the polymer terminals) and reducing inorganic anions which are impurities. In this respect, water is preferably used alone as the solvent or, in the case of using an organic solvent together with water, the amount of the organic solvent is preferably reduced as much as possible.

From the above aspect, in the case of using an organic solvent, for example, the amount of the organic solvent is preferably 10% by mass or less, more preferably 5% by mass or less, and still more preferably 1% by mass or less, in 100% by mass of the reaction solution after completion of the polymerization.

Here, solvents suitable for use with water include alcohols such as methyl alcohol, ethyl alcohol, and isopropyl alcohol; glycerol; polyethylene glycol; amides such as dimethylformaldehyde; and ethers such as diethylether and dioxane. Each of these may be used alone, or two or more of these may be used in combination.

In the polymerization reaction, the solids concentration after completion of the polymerization (which is a concentration of nonvolatile matters in the solution, and is measured by the method described below) is preferably 10 to 60% by mass, more preferably 15 to 50% by mass, and still more preferably 20 to 45% by mass, in 100% by mass of the polymerization solution.

(Other Production Conditions)

The poly(meth)acrylic acid-based polymer of the present invention may be produced by any one of the polymerization methods of a batch system, a continuous system, and a half-continuous system. The conditions of the method of producing the polyacrylic acid-based polymer of the present invention can be those in the above method, or may be, unless otherwise specified, a method commonly known as a polymerization method or a method obtained by modifying the known method.

The temperature for the polymerization is preferably 70° C. or higher, more preferably 75° C. to 110° C., and is still more preferably 80° C. to 105° C. A temperature for the polymerization in the above range tends to reduce the residual monomer component, and improve the dispersibility of the polymer. The polymerization temperature is not required to be constant at any time in process of polymerization reaction. For example, polymerization may be started at room temperature, and the temperature may be increased to a determined temperature in a suited increasing time or at a suited increasing rate, and then maintained at the determined temperature. The polymerization temperature may be changed (increased or decreased) with time while the polymerization reaction proceeds, depending on the monomer components and dropping method of the initiator and the like.

The pressure in the reaction system may be any of ordinary pressure (atmospheric pressure), reduced pressure, and increased pressure. In terms of the molecular weight of the polymer to be obtained, the polymerization is preferably performed under ordinary pressure, or increased pressure in a sealed reaction system. Also, in terms of the systems such as a pressurizer, a pressure reducing device, a pressure-resistant reaction vessel, and piping, the polymerization is preferably performed under ordinary pressure (atmospheric pressure). The atmosphere in the reaction system may be air atmosphere, but is preferably inert atmosphere. For example, the atmosphere in the system is preferably substituted with an inert gas such as nitrogen before the start of the polymerization.

[Slurry of Inorganic Particles]

The slurry of inorganic particles according to the present invention includes an acid equivalent amount of 0.05 to 10% by mass, preferably 0.1 to 3.0% by mass, and more preferably 0.2 to 2.0% by mass, of a poly(meth)acrylic acid-based polymer in 100% by mass of the slurry of inorganic particles. An amount of the poly(meth)acrylic acid-based polymer in the above range enables to decrease the viscosity of the slurry of inorganic particles of the present invention.

Here, the term "acid equivalent amount" is as described above, and refers to a value obtained by calculation with 100 mol % of the carboxyl groups being acid (—COOH).

The slurry of inorganic particles of the present invention is preferably produced, as described below, through adding the aqueous poly(meth)acrylic acid-based polymer solution of the present invention, and grinding the inorganic particles (i.e., through a process of adding the aqueous poly(meth) acrylic acid-based polymer solution of the present invention, and grinding the inorganic particles). Thereby, the viscosity of the slurry of inorganic particles can be stable over time, and the color of the slurry can also be favorable.

Examples of the inorganic particles used for the present invention include, but not particularly limited to, kaolin, clay, heavy calcium carbonate, light calcium carbonate, titanium dioxide, satin white, talc, aluminum hydroxide, plastic pigments, and the like.

The slurry of inorganic particles of the present invention includes 70% by mass or more, preferably 73% by mass, more preferably 75% by mass or more, and still more preferably 78% by mass or more, of inorganic particles in 100% by mass of the slurry of inorganic particles. An amount of less than 70% by mass of the inorganic particles in the slurry of inorganic particles decreases the productivity of paper in the case that, for example, the slurry is used as a slurry of a pigment (inorganic particles) for paper coating. The maximum amount of the inorganic particles is 85% by mass, for example.

The slurry of inorganic particles of the present invention includes a poly(meth)acrylic acid-based polymer, and the poly(meth)acrylic acid-based polymer is preferably the poly (meth)acrylic acid-based polymer of the present invention. That is, a slurry of inorganic particles including the aqueous poly(meth)acrylic acid-based polymer solution of the present invention, the slurry of inorganic particles including an acid equivalent amount of 0.05 to 10% by mass of the poly(meth)

acrylic acid-based polymer in 100% by mass of the slurry of inorganic particles, the slurry of inorganic particles including 70% by mass or more of inorganic particles in 100% by mass of the slurry of inorganic particles is one aspect of the present invention.

The slurry of inorganic particles of the present invention preferably has 75% by mass or more of a solids concentration, more preferably 78% by mass or more, still more preferably 80% by mass or more, and particularly preferably 83% by mass or more. The maximum solids concentration of the slurry of inorganic particles is 90% by mass, for example.

The solids concentration is a value measured by the later-described measuring method.

The slurry of inorganic particles of the present invention typically includes water, the content of water in that case is preferably 25% by mass or less, more preferably 22% by mass or less, still more preferably 20% by mass or less, and particularly preferably 17% by mass or less. The minimum amount of water in the slurry of inorganic particles is 10% by mass, for example.

The inorganic particles in the slurry of inorganic particles of the present invention have an average particle size of preferably 1.5 µm or smaller, and more preferably 1.0 µm or smaller. Here, the average particle size is obtained from particles sizes measured by a laser particle size distribution measuring device as used in Examples described below. The slurry of inorganic particles according to the present invention preferably includes 90 to 100% by mass, and more preferably 91 to 100% by mass, of particles with a particle size of 2 µm or smaller, in 100% by mass of the whole inorganic particles. A particle size in the above range improves the glossiness and whiteness of paper, for example in the case that the slurry of inorganic particles of the present invention is used as a pigment dispersant for paper coating.

The slurry of inorganic particles of the present invention may optionally include an organic solvent, and other additives such as condensed phosphoric acid and its salt, phosphonic acid and its salt, and polyvinyl alcohols.

The slurry of inorganic particles of the present invention preferably has a concentration of inorganic anions, each including a sulfur or phosphorus atom, of 100 to 400 ppm relative to the slurry of inorganic particles of the present invention. A concentration of inorganic anions, each including a sulfur or phosphorus atom, of higher than 400 ppm may decrease the long-term viscosity stability of the slurry of inorganic particles. A concentration of inorganic anions each including a sulfur or phosphorus atom of lower than 100 ppm brings difficulties in use of a polymer aqueous solution having excellent long-term dispersibility for a material. Thereby, the long-term viscosity stability of the slurry of inorganic particles may be decreased.

Examples of the inorganic anions each including a sulfur or phosphorus atom include sulfate ions, sulfite ions, phosphoric acid ions, phosphorous acid ions, and hypophosphorous acid ions.

The slurry of inorganic particles of the present invention preferably has low coloring, particularly has low coloring after being dried. For example, the color of the surface of the dried slurry preferably has a b value, measured with the colormeter SE2000 (product of Nippon Denshoku Industries Co., Ltd.), of 4.7 or lower. A slurry with a b value in such a range is regarded as having sufficiently low coloring ability. The b value is more preferably 4.5 or lower, still more preferably 4.0 or lower, particularly preferably 3.5 or lower, and most preferably 2.5 or lower. A low coloring ability allows the slurry to be suitable for, for example, a dispersant, a detergent builder, paper processing, paper coating, and other uses.

[Method of Producing Slurry of Inorganic Particles]

The method of producing the slurry of inorganic particles of the present invention is performed by any of appropriate methods commonly used as the method of producing inorganic particles or by a combination of these methods. Typical examples of the method includes a method of primarily dispersing the particles, and wet-grinding the dispersed particles. This method is suitable for obtaining a slurry of inorganic particles with low viscosity, excellent dispersion stability, and a high concentration. The method of producing the slurry of inorganic particles of the present invention is of course not limited to the method with the wet grinding treatment, and may be a method without the wet grinding treatment. The method of the primary dispersion in the method of producing the slurry of inorganic particles particularly is not limited and may be any method, but is preferably a method of mixing using a mixer. Here, mixers with a high shearing force such as high-speed dispers, homomixers, ball mills, coles mixers, and agitation dispers are preferred.

The method of producing the slurry of inorganic particles of the present invention preferably includes a process of mixing the aqueous poly(meth)acrylic acid-based polymer solution of the present invention and inorganic particles. Typically, water can be further used in the mixing process.

The method of producing the slurry of inorganic particles of the present invention preferably includes a process of adding the aqueous poly(meth)acrylic acid-based polymer solution of the present invention, and wet-grinding the inorganic particles. Thereby, the particle size of the inorganic particles in the slurry of inorganic particles can be efficiently set to a value in the desired range. In this case, the poly(meth)acrylic acid-based polymer (aqueous solution) of the present invention also acts as a grinding aid.

The method of producing the slurry of inorganic particles of the present invention enables to provide a slurry of pigment for paper manufacturing which has, for example, a low viscosity, long-term viscosity stability, and a high concentration. The method also prevents coating defects in coating with the slurry, achieves favorable base paper coating properties, print gloss, blister resistance, and uniform texture of the printing surface, and provides coated paper for printing which essentially has advantages of a pigment such as the whiteness, opacity, and ink receptivity.

The method of producing the slurry of inorganic particles of the present invention may employ a grinding aid commonly used as well as the poly(meth)acrylic acid-based polymer (aqueous solution) of the present invention. Examples of the grinding aid include a polyacrylic acid and its salt other than the poly(meth)acrylic acid-based polymer of the present invention, and a copolymer of an acrylic acid and a maleic acid, and its salt.

[Use of Poly(Meth)Acrylic Acid-Based Polymer (Aqueous Solution)]

The poly(meth)acrylic acid-based polymer of the present invention and the aqueous poly(meth)acrylic acid-based polymer solution of the present invention (they are collectively referred to also as "the poly(meth)acrylic acid-based polymer (aqueous solution) of the present invention") are preferably used as a dispersant for inorganic particles or a grinding aid for inorganic particles as described above. Use as a dispersant for inorganic particles or a grinding aid for inorganic particles enables to produce a slurry of inorganic particles which has a high concentration, a low viscosity, long-term viscosity stability, and an excellent color.

Such a dispersant for inorganic particles which includes the poly(meth)acrylic acid-based polymer (aqueous solution) of the present invention is yet another aspect of the present invention. Method of using the poly(meth)acrylic acid-based polymer (aqueous solution) of the present invention as a dispersant is yet another aspect of the present invention.

The poly(meth)acrylic acid-based polymer (aqueous solution) of the present invention can be used as a water treatment agent, a fiber treatment agent, a dispersant, or a detergent builder (or detergent composition). The detergent builder can be added to detergents for various uses such as clothes, tableware, dwellings, hair, bodies, tooth brushing, and cars.

<Chemicals for Water Treatment>

The poly(meth)acrylic acid-based polymer (aqueous solution) of the present invention can be used for chemicals for water treatment. The chemical for water treatment may include other additives such as polyphosphate, phosphonate, an anticorrosive, a slime control agent, and a chelating agent.

The chemical for water treatment is useful for prevention of scales in a cooling water circulation system, a boiler water circulation system, a seawater desalination plant, a pulp digester, and a black liquor condensing kettles. The chemical for water treatment may optionally include an appropriate aqueous polymer that does not affect the properties and effects thereof.

<Fiber Treatment Agent>

The poly(meth)acrylic acid-based polymer (aqueous solution) of the present invention can be used for a fiber treatment agent. This fiber treatment agent includes at least one selected from the group consisting of a stain, a peroxide, and a surfactant, and the polymer of the present invention.

The amount of the polymer of the present invention in the fiber treatment agent is preferably 1 to 100% by mass, and more preferably 5 to 100% by mass in the amount of the whole fiber treatment agent. The fiber treatment agent may optionally include an appropriate aqueous polymer that does not affect the properties and its effects.

A compounding example of the fiber treatment agent which is closer to the embodiments is described below. This fiber treatment agent can be used in the process of refinement, dyeing, bleaching, and soaping in the fiber treatment. Examples of the stain, peroxide, and surfactant include agents commonly used for a fiber treatment agent.

For improvement of the whiteness, color unevenness, and color fastness, for example, the compounding ratio of at least one selected from the group consisting of a stain, a peroxide, and a surfactant to the poly(meth)acrylic acid-based polymer (aqueous solution) of the present invention the composition for the fiber treatment agent is preferably 0.1 to 100 parts by mass per part by mass of the polymer of the present invention, in terms of the pure contents of the fiber treatment agent.

The fiber treatment agent may use for any appropriate fiber. Examples of the fiber include cellulosic fibers such as cotton and hemp, chemical fibers such as nylon and polyester, animal fibers such as wool and silk thread, semi-synthetic fibers such as rayon, and their woven clothes and blended fabrics.

In the case of applying the fiber treatment agent to a refining process, the poly(meth)acrylic acid-based polymer (aqueous solution) of the present invention, an alkali chemical, and a surfactant are preferably blended. In the case of applying the fiber treatment agent to a bleaching process, the poly(meth) acrylic acid-based polymer (aqueous solution) of the present invention, a peroxide, and a silicic acid-based chemical such as sodium silicate as a decomposition inhibitor for an alkaline bleaching agent are preferably used.

<Detergent Composition>

The poly(meth)acrylic acid-based polymer (aqueous solution) of the present invention can also be added to a detergent composition.

The amount of the polymer of the present invention in a detergent composition is not particularly limited. Still, in terms of achieving excellent builder properties, the amount of the polymer of the present invention is preferably 0.1 to 15% by mass, more preferably 0.3 to 10% by mass, and still more preferably 0.5 to 5% by mass in the whole amount of the detergent composition.

The detergent composition used for a detergent includes a surfactant and an additive which are typically used for a detergent. The specific forms of these surfactant and additive are not particularly limited, and common knowledge in the detergent field can be appropriately used. Also, the detergent composition may be a powder detergent composition or a liquid detergent composition.

The surfactant is one or two or more surfactants selected from the group consisting of anionic surfactants, nonionic surfactants, cationic surfactants, and ampholytic surfactants. In the case of using two or more surfactants in combination, the total amount of the anionic surfactant and the nonionic surfactant is preferably 50% by mass or more, more preferably 60% by mass or more, still more preferably 70% by mass or more, and particularly preferably 80% by mass or more in the whole amount of the surfactants.

Suitable examples of the anionic surfactants include alkyl benzene sulfonates, alkyl ether sulfates, alkenyl ether sulfates, alkyl sulfates, alkenyl sulfates, $\alpha$-olefin sulfonates, $\alpha$-sulfo fatty acid or its esters, alkane sulfonates, saturated fatty acid salts, unsaturated fatty acid salts, alkyl ether carboxylates, alkenyl ether carboxylates, amino acid-based surfactants, N-acylamino acid-based surfactants, alkylphosphonate esters or salts, and alkenylphosphonate esters or salts. The alkyl groups or alkenyl groups in these anionic surfactants may have a branched chain of an alkyl group such as a methyl group.

Suitable examples of the nonionic surfactants include polyoxyalkylene alkyl ethers, polyoxyalkylene alkenyl ethers, polyoxyethylene alkyl phenyl ethers, higher fatty acid alkanolamides or their alkylene oxide adducts, sucrose fatty acid esters, alkyl glycoxides, fatty acid glycerol monoesters, and alkylamine oxides. The alkyl groups or alkenyl groups in these nonionic surfactants may have a branched chain of an alkyl group such as a methyl group.

Suitable examples of the cationic surfactants include quaternary ammonium salts. Suitable examples of the ampholytic surfactants include a carboxyl ampholytic surfactant and a sulfobetaine ampholytic surfactant. The alkyl groups or alkenyl groups in these cationic surfactants and ampholytic surfactants may have a branched chain of an alkyl group such as a methyl group.

The compounding ratio of the surfactant is typically 10 to 60% by mass, preferably 15 to 50% by mass, more preferably 20 to 45% by mass, and particularly preferably 25 to 40% by mass, in the whole amount of the detergent composition. Too small an amount of the surfactant may not achieve sufficient washing performance, while too great an amount of the surfactant may decrease the economic efficiency.

Suitable additives include antiredeposition agents for preventing redeposition of pollutants (e.g., an alkali builder, a chelate builder, carboxymethylcellulose sodium), anti-fouling agents (e.g., benzotriazol, ethylene-thiourea), soil release agents, dye transfer inhibitors, softening agents, alkaline substances for pH regulation, perfume, solubilizing agents, fluorescence agents, colorants, frothing agents, foam stabilizers, lustering agents, germicides, bleaching agents, bleaching assistants, enzymes, dyes, and solvents. In the case of a powder detergent composition, zeolite is preferably blended.

The detergent composition may include detergent builder (s) other than the polymer of the present invention. Examples of the other detergent builder(s) include, but not particularly limited to, alkali builders such as carbonate, hydrogencarbonate, and silicate; chelate builders such as tripolyphosphate, pyrophosphate, mirabilite, nitrilotriacetate, ethylenediaminetetraacetate, citrate, fumarate, and zeolite; and carboxyl derivatives of polysaccharides such as carboxymethylcellulose. Examples of counter salts used with these builders include alkaline metals such as sodium and potassium, ammonium, and amines.

Typically, the total proportion of the above additives and the other detergent builder(s) is preferably 0.1 to 50% by mass, more preferably 0.2 to 40% by mass, still more preferably 0.3 to 35% by mass, particularly preferably 0.4 to 30% by mass, and most preferably 0.5 to 20% by mass or less, in 100% by mass of the detergent composition. A proportion of the additives/other detergent builder(s) of lower than 0.1% by mass may not achieve sufficient washing performance, whereas a proportion of higher than 50% by mass may be disadvantageous in terms of cost.

The concept of the detergent compositions includes detergents used only for specific usages such as a bleaching detergent in which the performance delivered by one component is improved, in addition to synthetic detergents of household detergents, detergents for industrial use such as detergents used in the fiber industry, and hard surface detergents.

When the detergent compositions are liquid detergent compositions, the water content of the liquid detergent compositions, typically, is preferably 0.1 to 75% by mass, more preferably 0.2 to 70% by mass, still more preferably 0.5 to 65% by mass, even more preferably 0.7 to 60% by mass, particularly preferably 1 to 55% by mass, and most preferably 1.5 to 50% by mass in the whole mass of the liquid detergent composition.

When the detergent compositions are liquid detergent compositions, the kaolin turbidity of the detergent compositions is preferably 200 mg/L or less, more preferably 150 mg/L or less, still more preferably 120 mg/L or less, particularly preferably 100 mg/L or less, and most preferably 50 mg/L or less.

The change (difference) in the kaolin turbidity between the cases of adding and not adding the poly(meth)acrylic acid-based polymer (aqueous solution) of the present invention as a detergent builder to a liquid detergent composition is preferably 500 mg/L or less, more preferably 400 mg/L or less, still more preferably 300 mg/L or less, particularly preferably 200 mg/L or less, and most preferably 100 mg/L or less. The kaolin turbidity is measured by the following method.

<Method of Measuring Kaolin Turbidity>

A uniformly stirred sample (liquid detergent) is charged in 50-mm square cells with a thickness of 10 mm, and bubbles are removed. Then, the sample is measured for turbidity (kaolin turbidity: mg/L) at 25° C. with a turbidimeter (trade name: NDH2000, product of Nihon Denshoku Industries Co., Ltd.).

Suitable examples of enzymes that can be mixed in the detergent compositions include proteases, lipases, and cellulases and the like. Among these, proteases, alkali lipases, and alkali cellulases are preferred because of their high activity in alkali-washing liquids.

The amount of the enzyme is preferably 5% by mass or less in 100% by mass of the detergent composition. An amount of the enzyme of more than 5% by mass may not improve the washing performance any more, and may be disadvantageous in cost.

The detergent composition does not cause much deposition of salt and achieves excellent washing performance even when used in an area in which hard water with a high concentration of calcium ions or magnesium ions (for example, 100 mg/L or more) is used. Such high performance is observed particularly in the case that the detergent composition includes an anionic surfactant such as LAS.

[Use of Slurry of Inorganic Particles]

The slurry of inorganic particles of the present invention can be used for paper coating, paper processing, ceramic molding, fiber treatment, and emulsion paint.

EXAMPLES

The following examples illustrate the present invention in more detail. They are, however, by no means limitative of the scope of the invention. Here, "part(s)" refers to "part(s) by mass", and "%" refers to "% by mass", unless otherwise specified.

The weight average molecular weight and number average molecular weight of the polymer of the present invention, the fixed amount of unreacted monomers, the solids content in the polymer composition and the polymer aqueous solution, and the active component value of polymer aqueous solution were measured by the following methods.

<Method of Measuring Solids Content in Polymer Aqueous Solution and Polymer Composition>

The polymer composition (1.0 g of polymer composition+3.0 g of water) was left to stand in an oven heated to 110° C. for two hours under a nitrogen atmosphere, for drying process. From the weight change between before and after the drying, a solids content (%) and a volatile component (%) were calculated.

<Active Component Measurement>

The active component value was calculated from a value obtained in measurement of the carboxyl group concentration in the polymer formed through polymerization with an automatic titrator COM-1500 produced by Hiranuma Sangyo Co., Ltd. First, the carboxyl acid in the polymer was completely neutralized with a 1N NaOH aqueous solution. A titration curve was drawn using a 1N HCl aqueous solution, and the active component value was calculated from the difference between the second point of inflexion and the first point of inflexion (1N HCl aqueous solution amount) in the curve.

Active component value (%)=9.4×(amount (mass) of 1N HCl at second point of inflexion−amount (mass) of 1N HCl at first point of inflexion)×HCl strength/amount of analyte (mass)

The amount of an analyte represents the mass of the analyzed aqueous poly(meth)acrylic acid-based polymer solution.

<Measurement Condition of the Color of Aqueous Poly (Meth)Acrylic Acid-Based Polymer Solution>

Device: using a colorimetric color difference meter (SE2000, product of Nippon Denshoku Industries Co., Ltd.), b value was measured in terms of permeability.

<Surface Color Measurement Condition of Slurry Dry Matter>

Device: using a colorimetric color difference meter (SE2000, product of Nippon Denshoku Industries Co., Ltd.), b value was measured in terms of reflectance.

<Measurement Condition of Weight Average Molecular Weight and Number Average Molecular Weight (GPC)>

The weight average molecular weight and number average molecular weight of the polymer were measured by GPC (gel permeation chromatography) under the following conditions.

Device: L-7000 series (product of Hitachi Ltd.)
Detector: RI Detector L-2490 (product of Hitachi Ltd.)
Column: TSK-GEL G3000PWXL (product of Tosoh Corp.)
Column temperature: 40° C.
Flow rate: 0.5 mL/min
Calibration curve: POLY SODIUM ACRYLATE STANDARD (product of Sowa Kagaku Co., Ltd.)
Eluate: solution obtained by diluting a mixture of sodium dihydrogenphosphate dodecahydrate/disodium hydrogenphosphate dihydrate (34.5 g/46.2 g) with 5000 g of pure water.

<Measurement of Monomers in Polymer Aqueous Solution and Polymer Composition>

Monomers were measured by liquid chromatography under the following condition.
Measurement device: L-7000 series (product of Hitachi Ltd.)
Detector: UV Detector L-7400 (product of Hitachi Ltd.)
Column: SHODEX RSpak DE-413 (product of Showa Denko K. K.)
Temperature: 40.0° C.
Eluate: 0.1% phosphoric acid aqueous solution
Flow rate: 1.0 mL/min <Anion Concentration Analysis (Ion Chromatograph Analysis)>

For the anion concentration analysis, ion chromatograph analysis was performed under the following condition.
Device: product of Metrohm (762 Interface)
Detector: product of Metrohm (732° C. Detector)
Ion analytical system: suppressor method
Column: Shodex IC SI-90 4E
Guard column: Shodex SI-90 G
Column temperature: 40° C.
Eluate: $NaHCO_3$ water (2 g is diluted with water to 2000 g)
Flow rate: 1.0 mL/min When the polymer aqueous solutions obtained in the following examples were analyzed, sulfuric acid ions derived from sodium persulfate and hypophosphite ions derived from sodium hypophosphite were detected.

<Analysis of Phosphorus-Containing Group in Polymer>

Phosphorus atoms having been introduced into the polymer was measured by $^{31}$P-NMR analysis. Peaks entirely derived from phosphinate groups were observed in the polymers obtained in the following examples.

The $^{31}$P-NMR analysis was performed by mixing 1 g of a polymer concentrate solution with 1 g of $D_2O$ for NMR analysis to produce a mixed solution with a polymer concentration of 20 to 35% for use.

<Evaluation Example>

An amount of 200 parts by mass (76.9% relative to the entire charged amount of the slurry solution) of a heavy calcium carbonate powder (commercially available product of Maruo Calcium Co., Ltd.) was charged into a 500-ml SUS 316 vessel. A four-neck separable flask that is wrapped with a heat insulating material and has a stirring seal in the widest opening at the lid upper part was mounted with a SUS 316 stirring blade with a three stage pin. The remaining openings were sealed with silicone rubber plugs, and the SUS 316 vessel and the glass lid upper part were fixed at two sites with fixing fasteners. The SUS316 stirring blade and the powerful stirring motor were connected, and firmly fixed to the pillar such that the connection was not loosened during grinding.

Then, one of the silicone rubber plugs of the four-neck separable flask was opened such that a funnel was inserted. While the stirring motor was operated to perform stirring at a low rotating rate at around 200 to 300 rpm, a mixture of 8 parts by mass of a polymer aqueous solution adjusted to an active component value of 10% (diluted with water or condensed) and 46 parts by mass of pure water, and 500 parts by mass of 2-mm ceramic beads were charged gradually in the stated order. After the entire amount of the mixture was charged, the rotational speed was increased at once to 1000 rpm. The state of the beads was checked, and the rotational speed was further increased to 1500 rpm. An amount of 4 parts by mass of a 10% polymer aqueous solution was added 40 minutes after the start of grinding, and 2 parts by mass of the solution was further added 70 minutes and 90 minutes after the start of grinding. The grinding was continued in this state until the proportion of particles with a particle size of 2 μm or smaller reach 90% or higher. Eventually, the amount of the polymer added was 0.80% by mass relative to the amount of the heavy calcium carbonate. After the grinding, the contents were separated from ceramics and collected.

The particle size was analyzed with a laser diffraction particle size analyzer LA-910 (product of Hitachi, Ltd.).

The viscosity of the slurry was measured with the Brookfield viscometer 5 minutes after rotation with the rotor No. 4 and 60 rpm (i.e., the slurry viscosity right after the rotation) for comparison. The collected slurry was stored in an environment at 25° C. until just before measurement.

The sample was stored at 25° C. for one week, and the viscosity of the slurry was measured with the Brookfield viscometer 5 minutes after rotation with the rotor No. 4 at 60 rpm (slurry viscosity after one week).

Example 1

Polymerization was performed using a batch-type polymerization pot (made of SUS, volume: 5 m$^3$), a thermometer provided for the polymerization pot, a stirrer (paddle blades), an external distillate circulating route and the jacket, the feed route (for polymerization compositions and neutralizers), and a reactor that has a flowing-back cooling device. The polymerization employed the polymerization method and conditions mentioned below. First, 345 parts by mass of ion exchange water was charged. Then, the temperature of the aqueous solution was increased using the external jacket under room temperature until the reflux occurs, while the aqueous solution in the polymerization pot was stirred.

Then, through different feed routes, an 80% by mass acrylic acid aqueous solution (hereinafter also referred to as "80% AA") (900 parts by mass) was dropped from the tip nozzle for 180 minutes, a 15% by mass sodium persulfate solution (hereinafter also referred to as "15% NaPS") (49 parts by mass) was dropped for 185 minutes, and a 45% by mass sodium hypophosphite solution (hereinafter also referred to as "45% SHP") was dropped at two stages at different feeding rates of 17 parts by mass over 20 minutes and then 70 parts by mass over 160 minutes. The dropping of each component except 45% SHP was continuously performed at a fixed drop rate.

Then, the aqueous solution was heated under the reflux conditions for 30 minutes, and the heating was stopped. 185 parts by mass of water was charged, and the polymer was neutralized by dropping 417 parts by mass of a 48% by mass sodium hydroxide solution (amount corresponding to AA neutralization index 50.0 mol %) from the tip nozzle through the feed route into the polymerization pot. In this way, an aqueous solution (1) including a polyacrylic acid-based polymer with 50 mol % of sodium salts of carboxyl groups and 50 mol % of acid carboxyl groups was obtained. The obtained aqueous solution (referred to polymer aqueous solution (1)) had a solids content of 52.7%, and an active component of 44.7%. The polymer aqueous solution (1) had a Brookfield viscosity of 850 mPa·s, a weight average molecular weight (Mw) of 5200, and a molecular weight distribution (weight average molecular weight (Mw)/number average molecular weight (Mn)) of 2.15. The polymer aqueous solution (1) had a b value of 2.50. The total concentration of inorganic anions each including a sulfur or phosphorus atom in the polymer aqueous solution (1) (mainly sulfuric acid ions and hypophosphite ions were detected) was 5100 ppm (of this, the concentration of inorganic anions each including a phosphorus atom was 3600 ppm).

The slurry viscosity of heavy calcium carbonate was evaluated by the above method, and the slurry viscosity after 1 hour from the end of the grinding was 800 mPa·s, and the slurry viscosity after 1 week was 1760 mPa·s. The color of the slurry dry matter surface was 2.10 in b value.

Example 2

An aqueous polyacrylic acid-based polymer solution (2) with 70 mol % of a sodium salt of carboxyl groups and 30 mol % of acid carboxyl groups was obtained in the same manner as in Example 1, except that the polymerization conditions were changed to those mentioned in Table 1. The obtained aqueous solution (referred to polymer aqueous solution (2)) had a solids content of 59.0%, and an active component of 45.4%. The polymer aqueous solution (2) had a Brookfield viscosity of 990 mPa·s, a weight average molecular weight (Mw) of 5400, and a value (weight average molecular weight (Mw)/number average molecular weight (Mn)) of 2.14. The polymer solution (2) had a b value of 2.88. The total concentration of inorganic anions each including a sulfur or phosphorus atom in the polymer aqueous solution (2) (mainly sulfuric acid ions and hypophosphite ions were detected) was 4700 ppm (of this, the concentration of inorganic anions each including a phosphorus atom was 3300 ppm).

The slurry viscosity of heavy calcium carbonate was evaluated by the above method in the same manner as in Example 1, and the slurry viscosity right after the end of the grinding was 900 mPa·s, and the slurry viscosity after 1 week was 3020 mPa·s. The color of the slurry dry matter surface was 2.25 in b value.

Example 3

An aqueous polyacrylic acid-based polymer solution (3) with 75 mol % of a sodium salt of carboxyl groups and 25 mol % of acid carboxyl groups was obtained in the same manner as in Example 1, except that the polymerization conditions were changed to those mentioned in Table 1. The obtained aqueous solution (polymer aqueous solution (3)) had a solids content of 52.4%, and an active component of 40.2%. The polymer aqueous solution (3) had a Brookfield viscosity of 800 mPa·s, a weight average molecular weight (Mw) of 5500, and a value (weight average molecular weight (Mw)/number average molecular weight (Mn)) of 2.15. The polymer solution (3) had a b value of 4.56. The total concentration of inorganic anions each including a sulfur or phosphorus atom in the polymer aqueous solution (3) (mainly sulfuric acid ions and hypophosphite ions were detected) was 4600 ppm (of this, the concentration of inorganic anions each including a phosphorus atom was 2800 ppm).

The slurry viscosity of heavy calcium carbonate was evaluated by the above method, and the slurry viscosity right after the end of the grinding was 910 mPa·s, and the slurry viscosity after 1 week was 3140 mPa·s. The color of the slurry dry matter surface was 2.30 in b value.

Comparative Example 1

An aqueous polyacrylic acid-based polymer solution (4) with 95.8 mol % of a sodium salt of carboxyl groups and 4.2 mol % of acid carboxyl groups was obtained in the same manner as in Example 1, except that the polymerization conditions were changed to those mentioned in Table 1. The obtained aqueous solution (polymer aqueous solution (4)) had a solids content of 46.6%, and an active component of 44.5%. The polymer aqueous solution (4) had a Brookfield viscosity of 900 mPa·s, a weight average molecular weight (Mw) of 5900, and a value of (weight average molecular weight (Mw)/number average molecular weight (Mn)) of 2.30. The polymer solution (4) had a b value of 4.87. The total concentration of inorganic anions each including a sulfur or phosphorus atom in the polymer aqueous solution (4) (mainly detected ions were sulfuric acid ions and hypophosphite ions) was 4200 ppm (of this, the concentration of inorganic anions each including a phosphorus atom was 2900 ppm).

The slurry viscosity of heavy calcium carbonate was evaluated by the above method in the same manner as in Example 1, and the slurry viscosity right after the end of the grinding was 1500 mPa·s, and the slurry viscosity after 1 week was 5100 mPa·s. The color of the slurry dry matter surface was 2.90 in b value.

The polymerization conditions and the analysis results of the polymers in Examples 1 to 3 and Comparative Example 1 are summarized in Table 1. In Table 1, the concentration of inorganic anions each including a sulfur or phosphorus atom in the polymer aqueous solution is referred to as the total ion concentration.

TABLE 1

|  |  |  | Example 1 | Example 2 | Example 3 | Comparative Example 1 |
|---|---|---|---|---|---|---|
| Polymerization conditions |  |  |  |  |  |  |
| Initial amount | Water | (parts by mass) | 345 | 345 | 345 | 362 |
| Dropping amount | 80% AA | (parts by mass) | 900 | 900 | 900 | 925 |
|  | 45% SHP① | (parts by mass) | 17 | 17 | 17 | 17 |
|  | 45% SHP② | (parts by mass) | 70 | 70 | 70 | 70 |
|  | 15% NaPS | (parts by mass) | 49 | 49 | 49 | 49 |
| Dropping time | 80% AA |  | 0-180 min | 0-180 min | 0-180 min | 0-180 min |
|  | 45% SHP① |  | 0-20 min | 0-20 min | 0-20 min | 0-20 min |
|  | 45% SHP② |  | 20-180 min | 20-180 min | 20-180 min | 20-180 min |
|  | 15% NaPS |  | 0-185 min | 0-185 min | 0-185 min | 0-185 min |

TABLE 1-continued

|  |  |  | Example 1 | Example 2 | Example 3 | Comparative Example 1 |
|---|---|---|---|---|---|---|
| Polymerization temperature |  | (° C.) | Boiling point | Boiling point | Boiling point | Boiling point |
| Aging time |  | (min) | 30 | 30 | 30 | 30 |
| Neutralization process | 48% NaOH | (parts by mass) | 417 | 583 | 625 | 820 |
|  | Neutralization ratio | (mol %) | 50.0 | 70.0 | 75.0 | 95.8 |
|  | Water | (parts by mass) | 185 | 185 | 185 | 185 |
| Polymerization result |  |  |  |  |  |  |
| Polymer analysis | Residual acrylic acid | (ppm) | >100 | >100 | >100 | >100 |
|  | Solids content | (% by mass) | 52.7 | 59.0 | 52.4 | 46.6 |
|  | Active component concentration | (%) | 44.7 | 45.4 | 40.2 | 44.5 |
|  | Viscosity | (mPa · s) | 850 | 990 | 800 | 900 |
|  | Total ion concentration | (ppm) | 5100 | 4700 | 4600 | 4200 |
|  | Mw |  | 5200 | 5400 | 5500 | 5900 |
|  | Mw/Mn |  | 2.15 | 2.14 | 2.15 | 2.30 |

Table 2 shows the evaluation results of the slurry of inorganic particles in Examples 1 to 3 and Comparative Example 1. In Table 2, the concentration of inorganic anions each including a sulfur or phosphorus atom in the slurry of inorganic particles is referred to as the total ion concentration.

TABLE 2

|  | Example 1 | Example 2 | Example 3 | Comparative Example 1 |
|---|---|---|---|---|
| Total ion concentration (ppm) | 180 | 170 | 170 | 160 |
| Slurry viscosity |  |  |  |  |
| Right after grinding (mPa · s) | 800 | 900 | 910 | 1500 |
| 1 week after grinding (mPa · s) | 1760 | 3020 | 3140 | 5100 |

The results in Table 2 show that the poly(meth)acrylic acid-based polymer (aqueous solution) of the present invention has favorable initial dispersibility and favorable long-term dispersibility, compared to the conventional polymers.

The invention claimed is:

1. An aqueous solution comprising a poly(meth)acrylic acid-based polymer,
   wherein the poly(meth)acrylic acid-based polymer consists of 90% by mass or more of a (meth)acrylic acid or salt thereof-derived structure and 0 to 10% by mass of a structure derived from another monomer based on 100% by mass of the entire monomer-derived structures,
   wherein in the case of the (meth)acrylic acid salt, the mass ratio is calculated as the corresponding acid,
   the another monomer is at least one monomer selected from the group consisting of monomers containing a carboxyl group other than (meth)acrylic acid and salts of the monomers containing a carboxyl group other than (meth)acrylic acid; hydroxyl group-containing alkyl (meth)acrylates, alkyl (meth)acrylates which are esters of (meth)acrylic acids containing C1 to C18 alkyl groups, amino group-containing acrylates, vinyl esters, maleimide and maleimide derivatives, nitrile group-containing vinyl monomers, monomers containing a sulfonic acid group and their salts; monomers containing phosphoric acid groups, monomers containing an aldehyde group, vinyl chloride, vinylidene chloride, allyl alcohol, and vinyl pyrrolidone,
   wherein the monomers containing a carboxyl group other than (meth)acrylic acid is at least one monomer selected from the group consisting of maleic acid, fumaric acid, itaconic acid, crotonic acid and 2-methyleneglutaric acid,
   and the maleimide derivative is phenylmaleimide and/or cyclohexyl maleimide,
   the poly(meth)acrylic acid-based polymer, wherein based on 100 mol % of the carboxyl groups, including all of the carboxyl groups contained in the poly(meth)acrylic acid-based polymer, 30 to 75 mol % of the carboxyl groups are in an alkali metal salt form, and 25 to 70 mol % of the carboxyl groups are in an acid form,
   the poly(meth)acrylic acid-based polymer contains a phosphorus-containing group, the poly(meth)acrylic acid-based polymer has a weight average molecular weight of 2000 to 9000,
   the aqueous poly(meth)acrylic acid-based polymer solution has a concentration of inorganic anions, each including a phosphorus atom, of 2500 to 4500 ppm relative to the aqueous poly(meth)acrylic acid-based polymer solution,
   and wherein the aqueous poly(meth)acrylic acid-based polymer solution has a pH of 4.0 to 6.0 when the solids content (nonvolatile matter concentration) is adjusted to 35 to 70% by mass.

2. A dispersant for inorganic particles, comprising the aqueous poly(meth)acrylic acid-based polymer solution according to claim 1.

3. A slurry comprising the aqueous poly(meth)acrylic acid-based polymer solution according to claim 1, and inorganic particles, wherein the slurry includes an acid equivalent amount of 0.05 to 10% by mass of the poly(meth)acrylic acid-based polymer based on 100% by mass of the slurry, and includes 70% by mass or more of inorganic particles based on 100% by mass of the slurry.

4. The aqueous poly(meth)acrylic acid-based polymer solution according to claim 1, wherein the poly(meth)acrylic acid-based polymer has a molecular weight distribution (weight average molecular weight (Mw)/ number average molecular weight (Mn)) of 1.1 to 3.0.

5. The aqueous poly(meth)acrylic acid-based polymer solution according to claim 1, which includes unreacted monomers, and wherein the amount of the unreacted monomers is less than 1% by mass based on 100% by mass of the solids content of polymer aqueous solution.

6. The aqueous poly(meth)acrylic acid-based polymer solution according to claim 1, having a b value is 4.6 or lower, wherein the b value is measured with the colormeter SE2000 as a color of the aqueous poly(meth)acrylic acid-based polymer solution.

7. The aqueous poly(meth)acrylic acid-based polymer solution according to claim 1, wherein the hydroxyl group-containing alkyl (meth) acrylates are at least one monomer selected from the group consisting of 2-hydroxyethyl (meth) acrylate, 2-hydroxypropyl (meth) acrylate, 3-hydroxypropyl (meth) acrylate, 2-hydroxybutyl (meth) acrylate, 4-hydroxybutyl (meth) acrylate, and α-hydroxymethylethyl (meth) acrylate.

8. The aqueous poly(meth)acrylic acid-based polymer solution according to claim 1, wherein the alkyl (meth) acrylates are at least one monomer selected from the group consisting of methyl (meth) acrylate, ethyl (meth) acrylate, butyl (meth) acrylate, cyclohexyl (meth) acrylate, and lauryl (meth) acrylate.

9. The aqueous poly(meth)acrylic acid-based polymer solution according to claim 1, wherein the monomers containing a sulfonic acid group are at least one monomer selected from the group consisting of 3-allyloxy-2-hydroxypropane sulfonic acid, 2-acrylamido-2-methylpropane sulfonic acid, styrene sulfonic acid, vinylsulfonic acid, and their salts.

10. The aqueous poly(meth)acrylic acid-based polymer solution according to claim 1, wherein the poly(meth)acrylic acid-based polymer has a weight average molecular weight of 3000 to 8000.

11. The aqueous poly(meth)acrylic acid-based polymer solution according to claim 1, wherein the aqueous poly (meth)acrylic acid-based polymer solution has a concentration of inorganic anions, each including a phosphorus atom of 2500 to 3600 ppm relative to the aqueous poly(meth)acrylic acid-based polymer solution.

* * * * *